US011750773B2

(12) United States Patent
Burgess et al.

(10) Patent No.: US 11,750,773 B2
(45) Date of Patent: Sep. 5, 2023

(54) REAL-TIME, TWO-WAY VIDEO AUTHENTICATION SYSTEM

(71) Applicant: Bank of America Corporation, Charlotte, NC (US)

(72) Inventors: Patrick Burgess, Stockholm (SE); Trish Gillis, Chicago, IL (US); Taylor Farris, Hoboken, NJ (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 17/411,438

(22) Filed: Aug. 25, 2021

(65) Prior Publication Data

US 2023/0061941 A1    Mar. 2, 2023

(51) Int. Cl.
*H04N 7/15* (2006.01)
*G06F 21/44* (2013.01)
*G06N 20/00* (2019.01)
*G06F 16/71* (2019.01)
*G06F 3/048* (2013.01)

(52) U.S. Cl.
CPC ............. *H04N 7/155* (2013.01); *G06F 3/048* (2013.01); *G06F 16/71* (2019.01); *G06F 21/44* (2013.01); *G06N 20/00* (2019.01)

(58) Field of Classification Search
CPC ................................ H04N 7/155; H04N 7/15
See application file for complete search history.

(56) References Cited

U.S. PATENT DOCUMENTS

| 8,661,355 | B1* | 2/2014 | Liu ...................... G06F 3/0481 |
| | | | 715/768 |
| 8,788,670 | B2 | 7/2014 | Seif et al. |
| 10,033,861 | B1 | 7/2018 | Farnsworth et al. |
| 10,257,586 | B1* | 4/2019 | Mensh ............ H04N 21/47217 |
| 10,389,874 | B1 | 8/2019 | Farnsworth et al. |
| 10,698,743 | B2 | 6/2020 | Studnicka |
| 2010/0037165 | A1* | 2/2010 | Correl ..................... G09G 5/14 |
| | | | 715/768 |
| 2013/0263231 | A1* | 10/2013 | Lautenschlager ....... H04L 63/08 |
| | | | 726/4 |
| 2013/0333014 | A1 | 12/2013 | Batara |
| 2014/0240516 | A1* | 8/2014 | Kolarov ................. H04N 17/00 |
| | | | 348/180 |
| 2015/0128240 | A1* | 5/2015 | Richards ............ H04W 12/068 |
| | | | 726/7 |
| 2021/0105232 | A1 | 4/2021 | Estrada et al. |

* cited by examiner

*Primary Examiner* — Olisa Anwah
(74) *Attorney, Agent, or Firm* — Weiss & Arons LLP

(57) ABSTRACT

Methods for onboarding a client user to a real-time video chat authentication system is provided. Methods may include, during an onboarding session, receiving the client user's credentials. The client user's credentials may be received at a client user graphical user interface (GUI). Methods may include receiving an opt-in from the client user for authentication via video capture. The opt-in may also be received at the client user GUI. Methods may include initiating a video capture session at a video conferencing platform. The video conferencing platform may be executed at a client device and an administrator device. The platform may enable the client user to communicate with an administrative user. Methods may include capturing a video capture of the client user at the video conferencing platform. Methods may include storing the video capture at a database.

13 Claims, 7 Drawing Sheets

REAL-TIME, TWO-WAY VIDEO AUTHENTICATION SYSTEM

FIELD OF TECHNOLOGY

Aspects of the disclosure relate to authentication systems.

BACKGROUND OF THE DISCLOSURE

Conventional authentication for computer applications and devices typically involves entry of data, such as usernames, static and dynamic passwords and/or biometrics. In order to authenticate into computer applications or devices, a user will enter such data into an authentication screen or window.

Typically, usernames, passwords and biometrics are secure identifiers. However, because of the lack of real-time human element, such authentication may be compromised by a person of malicious intent. Also, with transactions that involve high security, such as when large payment amounts are being approved, it may be desirable to utilize more secure authentication methods. It would be further desirable to involve a human in an automated authentication process.

Additionally, streaming video has recently become available on more devices. Therefore, it would be desirable to utilize two-way streaming video communication to authenticate a user at a computer application or device.

SUMMARY OF THE DISCLOSURE

Apparatus and methods for onboarding a client user to a real-time video chat authentication system is provided. During an onboarding session, the client user's credentials may be received at the authentication system. The client user's credentials may be received in a web-based entry field, such as an entry field on a webpage or web-based application. The webpage and/or web-based application may execute on a mobile device, personal computer (PC) or any other suitable computing device. The client user's credentials may include a username, password, biometrics, mobile device telephone number and/or any other suitable credentials. In some embodiments, the authentication system may also receive an opt-in from the client user for authentication via video capture. The opt-in may also be received in a web-based entry field.

Upon receipt of the client user's credentials and the opt-in for authentication via video capture, the authentication system may initiate a video capture session. The video capture session may be executed at a video conferencing platform. Such a video conferencing platform may be a computer application visible on one or more computing devices and hosted on one or more computers or servers.

The video capture session may include a client-facing graphical user interface (GUI) and an administrator-facing GUI. The client-facing GUI may reside on a client device. The client device may be a PC, mobile device, server or any other suitable computing device. The client device may be the device from which the client user credentials were received. The administrator-facing GUI may reside on an administrator computer. The administrator computer may be a PC, mobile device, server or any other suitable computing device.

The video capture session may enable the client user, operating the client-facing GUI, to communicate with an administrative user, operating the administrator-facing GUI. The video capture session may enable the client user to view the administrative user on the client-facing GUI. The video capture session may enable the administrative user to view the client user on the administrator-facing GUI.

The video capture session may involve capturing a video capture of the client user at the video conferencing platform. The video capture may be stored in a database. In some embodiments, the database may store videos relating to a plurality of client users.

In order to initiate a real-time verification session, a request may be transmitted from the client user to the video conferencing platform. Once the request is received at the video conferencing platform, the video conferencing platform may initiate a real-time verification session.

During a real-time verification session, the client user may be requested to authenticate using the video conferencing platform. The authentication request may be received at the video conferencing platform. The video conferencing platform may receive authentication approval from the client user. The approval may be regarding the authentication request.

The video conferencing platform may instantiate a video instance in response to receipt of authentication approval from the client user. The video instance may include a video window on the client-facing GUI and a video window on the administrator-facing GUI. The video instance may enable the administrative user and the client user to view a real-time video capture of each other via the video conferencing platform. The video instance may enable the administrative user to view a real-time video capture of itself. The video instance may also enable the client user to view of a real-time video capture of itself.

In response to an instruction from the administrative user, the video conferencing platform may retrieve a stored video capture of the client user from the database. The video capture may be the video capture that was stored in the database during the onboarding of the client user.

The video conferencing platform may display the video window on the administrator-facing GUI. The video window displayed on the administrator-facing GUI may include the real-time view of the client user. The video conferencing platform may also display the stored video capture on the administrator-facing GUI. In some embodiments, the stored video capture may be displayed side-by-side with the video window. In other embodiments, the stored video capture may be displayed as an overlay on top of the video window. In yet other embodiments, the video window may be displayed as an overlay on top of the stored video capture. The stored video capture and/or the video window may be semi-transparent. The semi-transparency of the top window or capture may enable a user to view the bottom window or capture. The bottom window or capture may include an opaque video. Being able to view both the stored video capture and the video window either side-by-side, or as an overlay one on top of the other, may enable the administrative user to determine whether the person displayed in the real-time video is the same person as the one stored in the database.

The administrator-facing GUI may receive an indication of verification of the client user. The indication may be received from the administrative user. The indication may be received from the GUI itself. The indication may be derived from to a comparison of the stored video capture to the video of the client user on the video window on the administrator-facing GUI. The indication of verification may include receiving a selection of a selectable button on the administrator-facing GUI. The selection may be received from the administrative user. The selectable button may indicate that the client user either passed or failed verification.

In some embodiments, the indication of verification may be generated automatically. The indication may be based on an algorithm configured to compare the stored video capture to the real-time video capture. The algorithm may be configured to generate an indication of similarity in response to finding a threshold level of similarity between the stored video capture and the real-time video capture. The algorithm may utilize machine learning. The algorithm may be executed by one or more executables. The one or more executables may be executed on the administrator-facing GUI. The one or more executables may perform the actions of the administrative user. Such actions may include selecting the selectable button to indicate that the client user either passed or failed verification.

Once the client user is verified, the client user may be enabled to perform one or more authenticated executables. Such authenticated executables may include payment approvals, entry into one or more predetermined computing applications and/or any other suitable authenticated executables.

The video conferencing platform may receive the selection or other automatically-generated indication that the client user passed verification. In response to receipt of the selection of verification, the client-facing GUI may display an authorization request to store the real-time video capture of the client user being viewed on the administrator-facing GUI. Upon receipt of such authorization from the client user, the video conferencing system may store the real-time capture of the client user in the database. In some embodiments, the previously stored video capture may overwrite and/or replace the stored video capture with the real-time capture of the client user. The decision to replace the stored video capture with the real-time video capture may be an administrative user decision, a client user decision or a system-set decision.

In some embodiments, the overwrite may maintain factors from the stored video capture in order to formulate a baseline stored video capture. In such embodiments, the baseline stored video capture may be updated with each additional video capture taken. The baseline stored video capture may include facial measurements, such as those described in para. 46 below. At times, the baseline stored video capture may be compared with the real-time video capture.

In certain embodiments, the stored video capture stored in the database includes a limited amount of data. The limited amount of data when compared to the real-time video capture may be used to determine when the real-time video capture matches, or achieves a threshold level of similarity to, the limited amount of data over a predetermined percentage threshold.

In some embodiments, the stored video capture includes a first limited amount of data and the real-time video capture includes a second limited amount of data. The first limited amount of data when compared to the second limited amount of data may be used to verify the client user. The first limited amount of data and the second limited amount of data may preferably not include personally identifiable information ("PII"). As such, in the event that a person of malicious intent retrieves data from the database, the videos stored in the database may be unable to identify a person in the video. Therefore, the privacy of the stored videos may not be compromised by the person of malicious intent.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
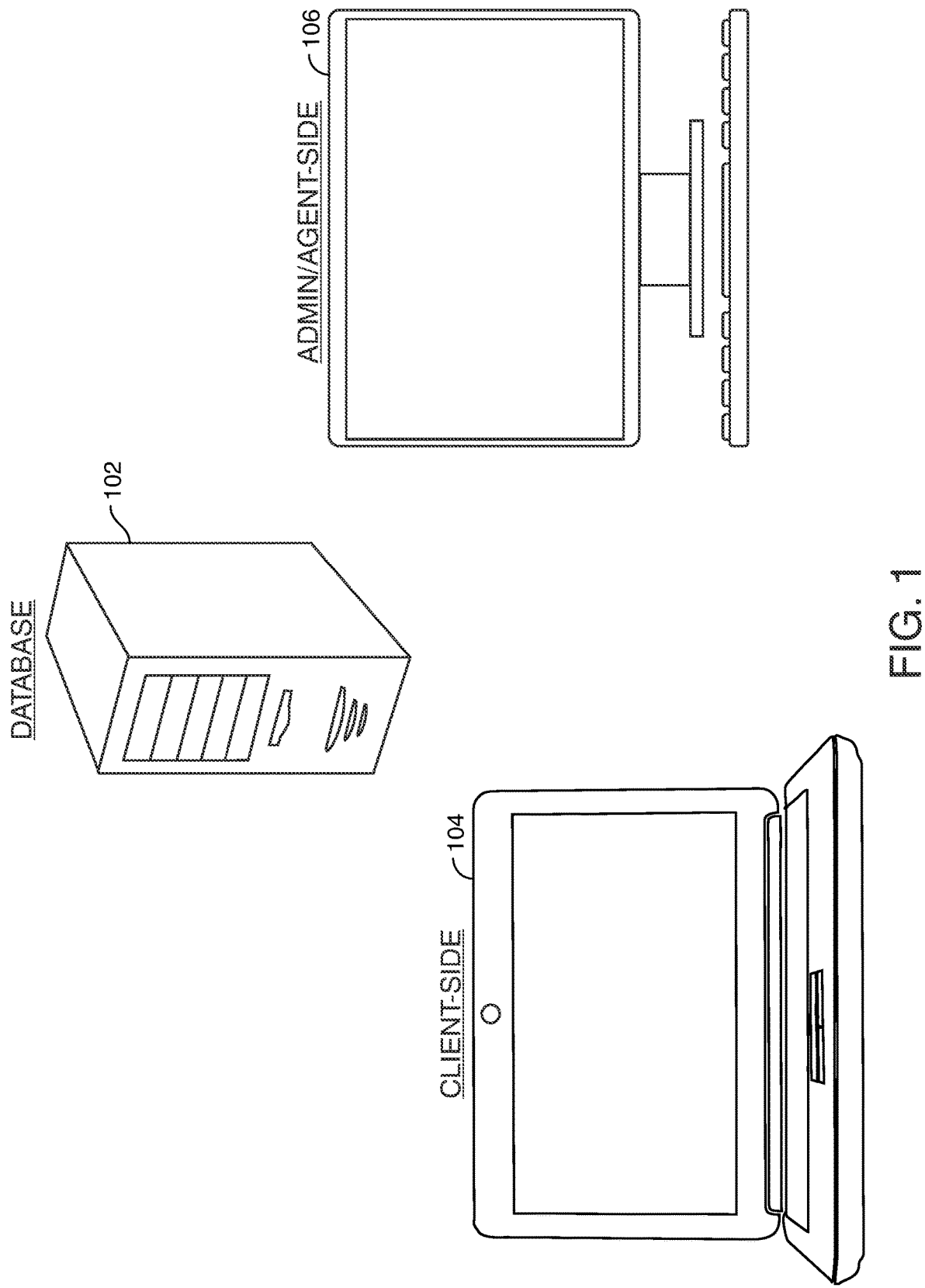
FIG. 1 shows an illustrative diagram in accordance with principles of the disclosure.

Apparatus and methods for a real-time video chat authentication system are provided. The system may include, or may leverage, a video conferencing application.

The video conferencing application may include a client-facing GUI. The client-facing GUI may be viewable on a client-facing device, such as a client mobile device, a client smartwatch, a client PC or any other suitable device. The client-facing GUI may be hosted by the video conferencing system. The client-facing GUI may be a web-based GUI. The client-facing GUI may be operated by a client user.

The video conferencing application may include an administrator-facing GUI. The administrator-facing GUI may be viewable on an administrator-facing device, such as an administrator mobile device, an administrator smartwatch, an administrator PC or any other suitable device. The administrator-facing GUI may be hosted by the video conferencing system. The administrator-facing GUI may be a web-based GUI. The administrator-facing GUI may be operated by an administrative user.

The video conferencing application may include a database. The database may include stored videos relating to a plurality of client users, such as the client user.

The administrator-facing GUI may receive an instruction from the administrative user to authenticate the client user. Such an instruction may be received when the client user transmits a request for authentication. The request for authentication may be transmitted at the client-facing GUI. The request for authentication may be transmitted from a webpage. The request for authentication may be transmitted from an authentication request application on a mobile device or smartwatch. The request for authentication may be transmitted from any other suitable application.

In response to receiving an instruction to authenticate the client user, the application may instruct the client-facing GUI to request a selection from the client user. The selection may enable the client user to approve authentication using the video conferencing application.

Upon receipt of approval for authentication using the video conferencing application from the client user, the video conferencing application may instantiate a video conference instance. The video conference instance may include a video window on the client-facing GUI and a video window on the administrator-facing GUI. The instance may enable the administrative user and the client user to view each other in real-time via the video conferencing application.

The video conference instance may retrieve a stored video of the client user from the database. The administrator-facing GUI may instantiate a stored video window. The stored video window may display the stored video. The stored video window may be adjacent to the video window on the administrator-facing GUI.

The administrator-facing GUI may enable the administrative user to verify the client user by comparing the stored video to a view of the client user in the video window on the administrator-facing GUI.

The administrator-facing GUI may display a selectable button. Selection of the selectable button by the administrative user may indicate that the client is verified. The administrator-facing GUI may receive a selection of the selectable button from the administrative user. The selection may indicate that the client user is verified.

Upon receipt of the selection indicating that the client user is verified, the client-facing GUI may provide a selectable authorization request to the client user. The selectable authorization request may enable the client user to authorize storing a real-time video capture from the video conferencing application. The client-facing GUI may receive authorization from the client user to store the real-time video capture from the video conferencing application.

In some embodiments, the video conferencing application may overwrite the stored video capture of the client user stored in the database with the real-time video capture. In certain embodiments, the video conferencing application may replace the stored video capture of the client user stored in the database with the real-time video capture.

In yet other embodiments, the video conferencing application may store the real-time video capture of the client user adjacent to the stored video capture. Storing a first video capture adjacent to a second video capture may be understood to mean storing the second video capture in the same section of memory as the first video capture. Storing the second video capture adjacent to the first video capture may enable the first video capture to be retrieved in less than a threshold amount of time after retrieval of the second video capture. At times, both the first video capture and the second video capture may be retrieved. The first video capture may be retrieved simultaneously with the second video capture. The first video capture may be retrieved upon request from the administrative user after the retrieval of the second video capture. Retrieval of both the first video capture and the second video capture may be executed when a higher level of verification is requested by the administrative user and/or the client user.

The stored video capture stored in the database may include a limited amount of data. The limited amount of data when compared to a view of the client user displayed on the video window on the administrator-facing GUI may be used to determine if the current view of the client user matches the limited amount of data over a predetermined threshold.

The stored video capture stored in the database may include a first limited amount of data. A video of the client user displayed on the video window on the administrator-facing GUI may include a second limited amount of data. The first limited amount of data and the second limited amount of data can be used to verify the identity of the client user.

The first limited amount of data and the second limited amount of data may not include PII.

An algorithm may be implemented to compare the first limited amount of data of the stored video capture to the second limited amount of data of the real-time video, or even a still photo retrieved from a video, of the client user. The algorithm may compare the first limited amount of data to the second limited amount of data. The algorithm may verify the client user based on the comparison. The algorithm may compare various factors between the first limited amount of data and the second limited amount of data.

The various stored or live videos may include certain facial measurements, such as the space between various facial features. Such space between various facial features may include space between features such as between the eyes, between the nose and mouth, etc. Other suitable factors may include measurements of the facial features themselves.

The comparison of the factors may be a criterion in establishing whether the comparison between the first limited amount of data and the second limited amount of data verify the identity of the client user. In some embodiments, the comparison of the factors may be a criterion for establishing whether the comparison verifies the identity of the user over a predetermined degree of confidence.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. A video conferencing authentication platform may execute a video conferencing authentication application concurrently in multiple locations on multiple devices. The video conferencing authentication platform may be executed on database 102, client-side device 104 and admin/agent-side device 106. Database 102 may store data relating to authenticating a client user. For example, database 102 may store photographs or videos relating to the client user. Database 102 may also store other identification data relating to the client user. Such other identification data may include name, address, identification number, mobile device telephone number or any other suitable identification data. The identification data may be linked to the photographs or videos within the database. The identification data may be metadata for the photographs or videos. The identification data may be used to index the photographs or videos.

Client-side device 104 may be a device that is operable to run a client-side video conferencing authentication application. The client-side device 104 may be a laptop (as shown in FIG. 1), a PC, a mobile device, a smartwatch or any other suitable device.

Admin/agent-side device 106 may be a device that is operable to run an admin/agent-side video conferencing authentication application. The admin/agent-side device may be a PC (a shown in FIG. 1), a laptop, a mobile device a smartwatch of any other suitable device.

Figure 2:
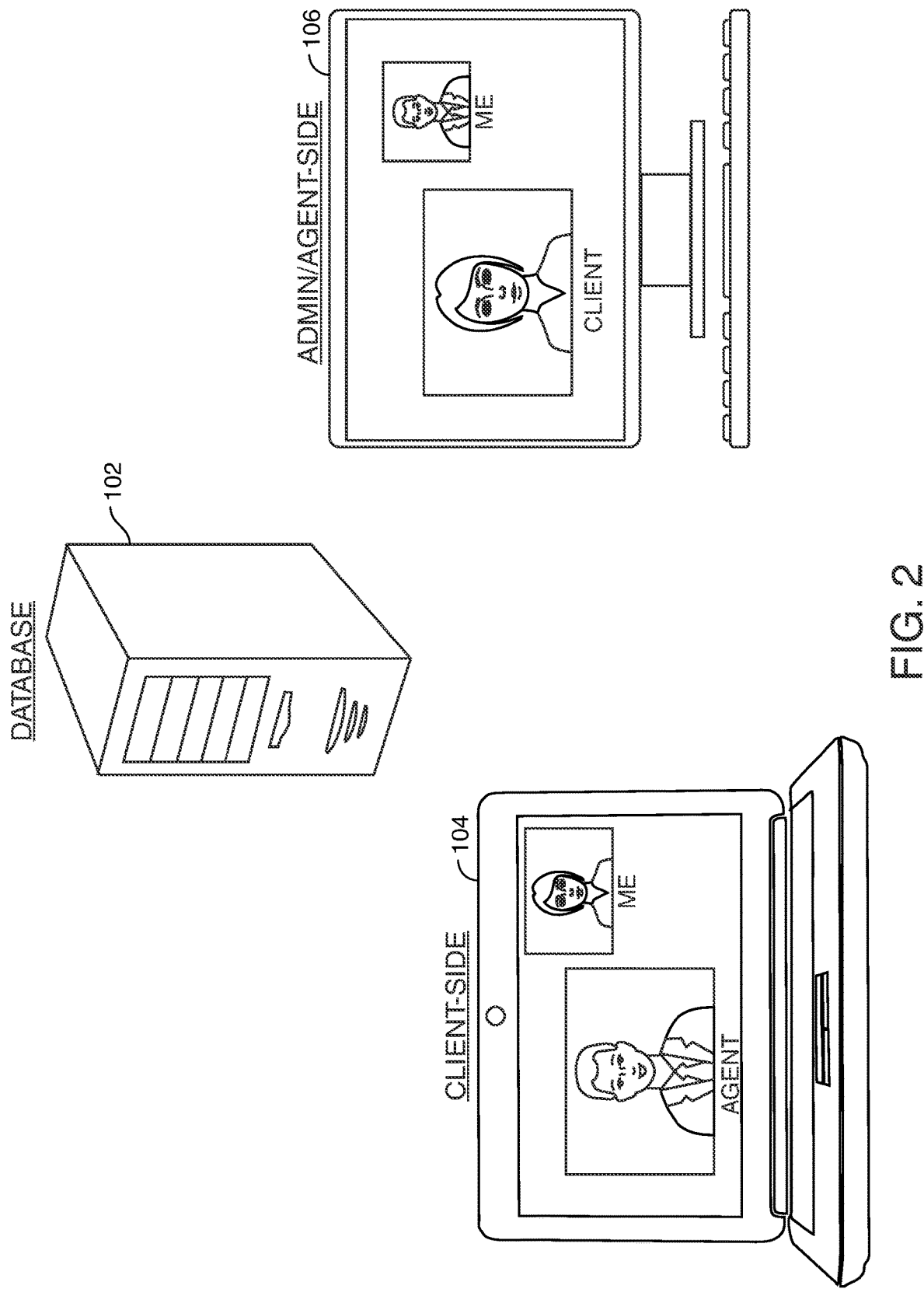
FIG. 2 shows another illustrative diagram in accordance with principles of the disclosure.

FIG. 2 shows an illustrative diagram. Database 102, client-side device 104 and admin/agent-side device 106 are shown once a video conferencing authentication application has been initiated on both client-side device 104 and admin/agent-side device 106.

Client-side device 104 shows a client-side GUI. The client-side GUI shows a display of the agent and a smaller display of the client. The display of the client may be shown in order for a client user, using client-side device 104, to determine what is being viewed on the agent-side GUI.

Admin/agent-side device 106 shows an agent-side GUI. The agent-side GUI shows a display of the client and a smaller display of the agent. The display of the agent may be shown in order for an administrative user, using admin/agent-side device 106, to determine what is being viewed on the client-side GUI.

Figure 3:
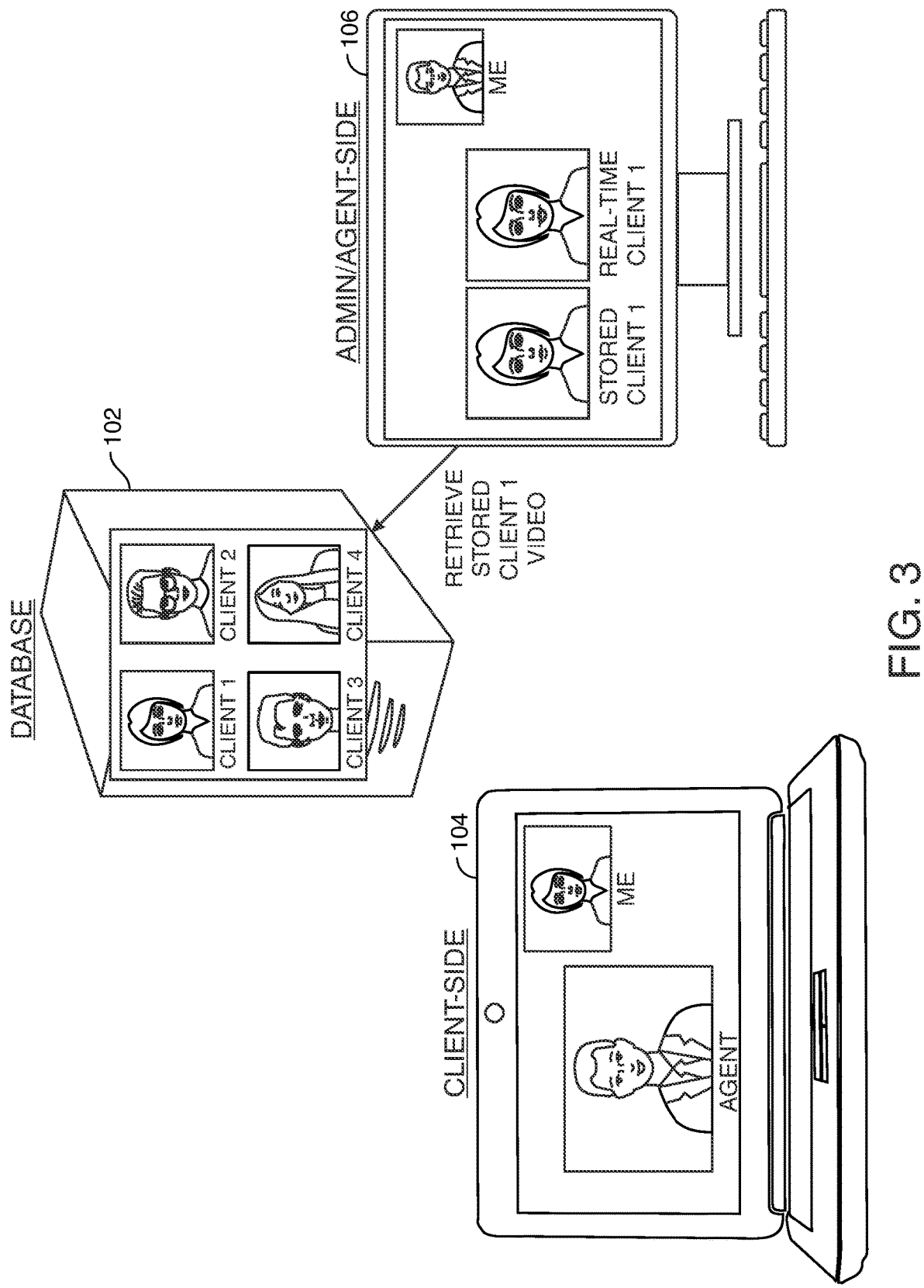
FIG. 3 shows yet another illustrative diagram in accordance with principles of the disclosure.

FIG. 3 shows another illustrative diagram. In order to authenticate the client, the administrative user may receive identification information regarding the client. Such identification information may include client name, telephone number or other suitable identification information. The identification information may be used to index the client videos within database 102.

Admin/agent side device 106 may identify that the client using client-side device 104 may be identified as client 1. Admin/agent-side device 106 may retrieve a stored video of claim 1 from database 102. The stored video may be displayed on the admin/agent-side GUI. The stored video may be displayed side-by-side with the real-time video display.

The administrative user may be able to verify the identity of the client user by viewing the stored client video side-by-side with the real-time video. Such verification may determine whether the stored client video is the same person as the person in the real-time video. The algorithm used may compare facial features of the stored client video with facial features included in the real-time video. The algorithm may compare measurements between facial features in stored video to measurements between facial features in the real-time video. The algorithm may also compare measurements of the facial features themselves. The algorithm may determinate whether the comparison between the two videos verifies the identity of the client user above a predetermined threshold level of confidence. Upon verification, the algorithm may verify the identity of the client user.

Figure 4:
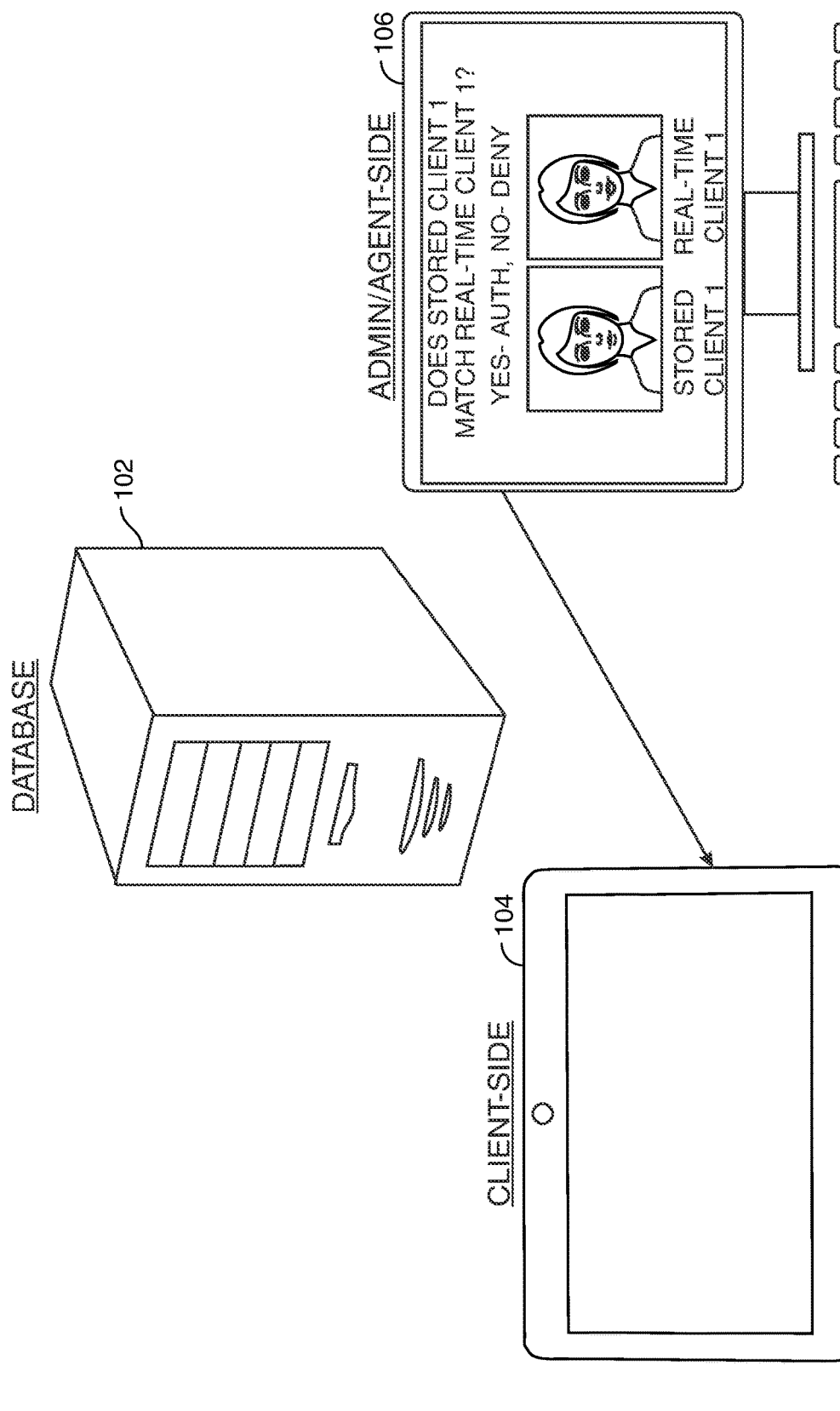
FIG. 4 shows still another illustrative diagram in accordance with principles of the disclosure.

FIG. 4 shows an illustrative diagram. The admin/agent-side GUI may present a query to the administrative user. The query may query whether the stored client 1 matches the real-time client 1. The query may be answered by a computer-based algorithm, such as the one described above. The determination of the algorithm may complete the verification. The determination of the algorithms may be presented to the administrative user. The administrative user may verify the client user based, in part or in whole, on the determination of the algorithm. The administrative user may be able to select yes or no. A yes selection may authorize the client user. A no selection may deny authorization of the client user.

Figure 5:
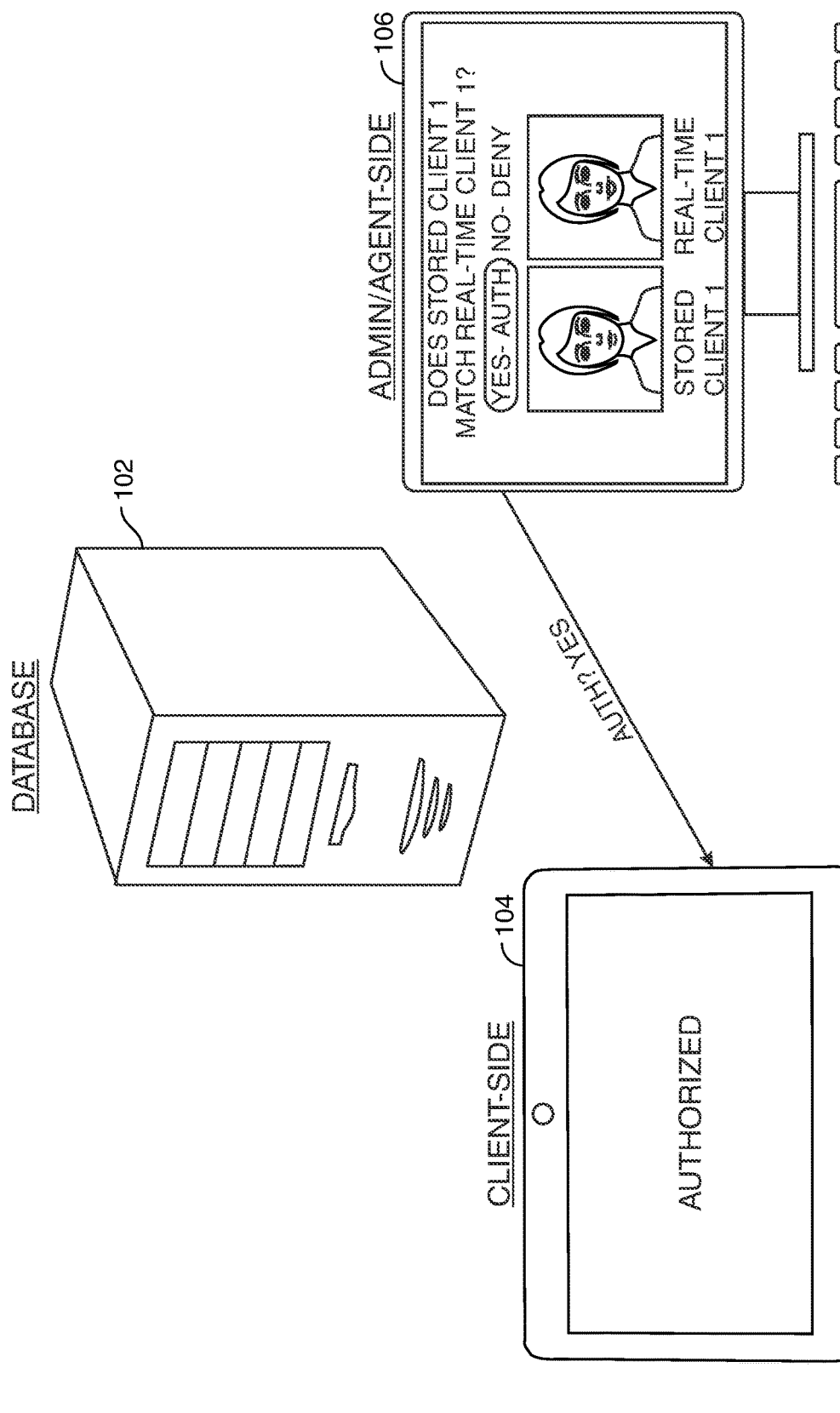
FIG. 5 shows yet another illustrative diagram in accordance with principles of the disclosure.

FIG. 5 shows an illustrative diagram. As shown, the administrative user selected the yes selection. As such, the client user may be authorized. Therefore, an authorization indication was transmitted to client-side device 104. Client-side device 104 may display the authentication data on the client-side GUI.

Figure 6:
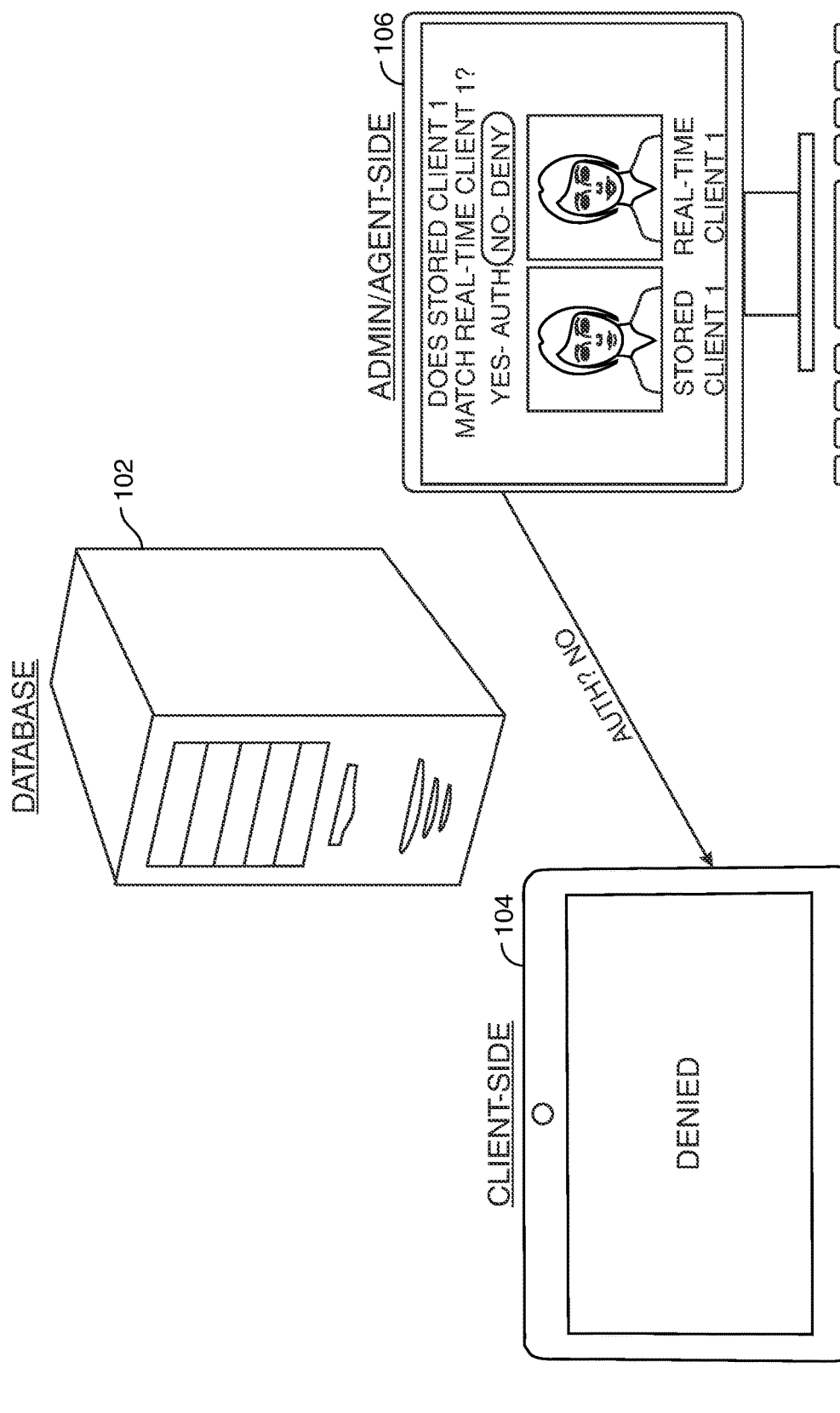
FIG. 6 shows still another illustrative diagram in accordance with principles of the disclosure.

FIG. 6 shows an illustrative diagram. As shown, the administrative user selected to no selection. As such, the client user may be denied authorization. Therefore, a denied authorization indication may be transmitted to client-side device 104. Client-side device 104 may display the denied authenticated data on the client-side GUI.

Figure 7:
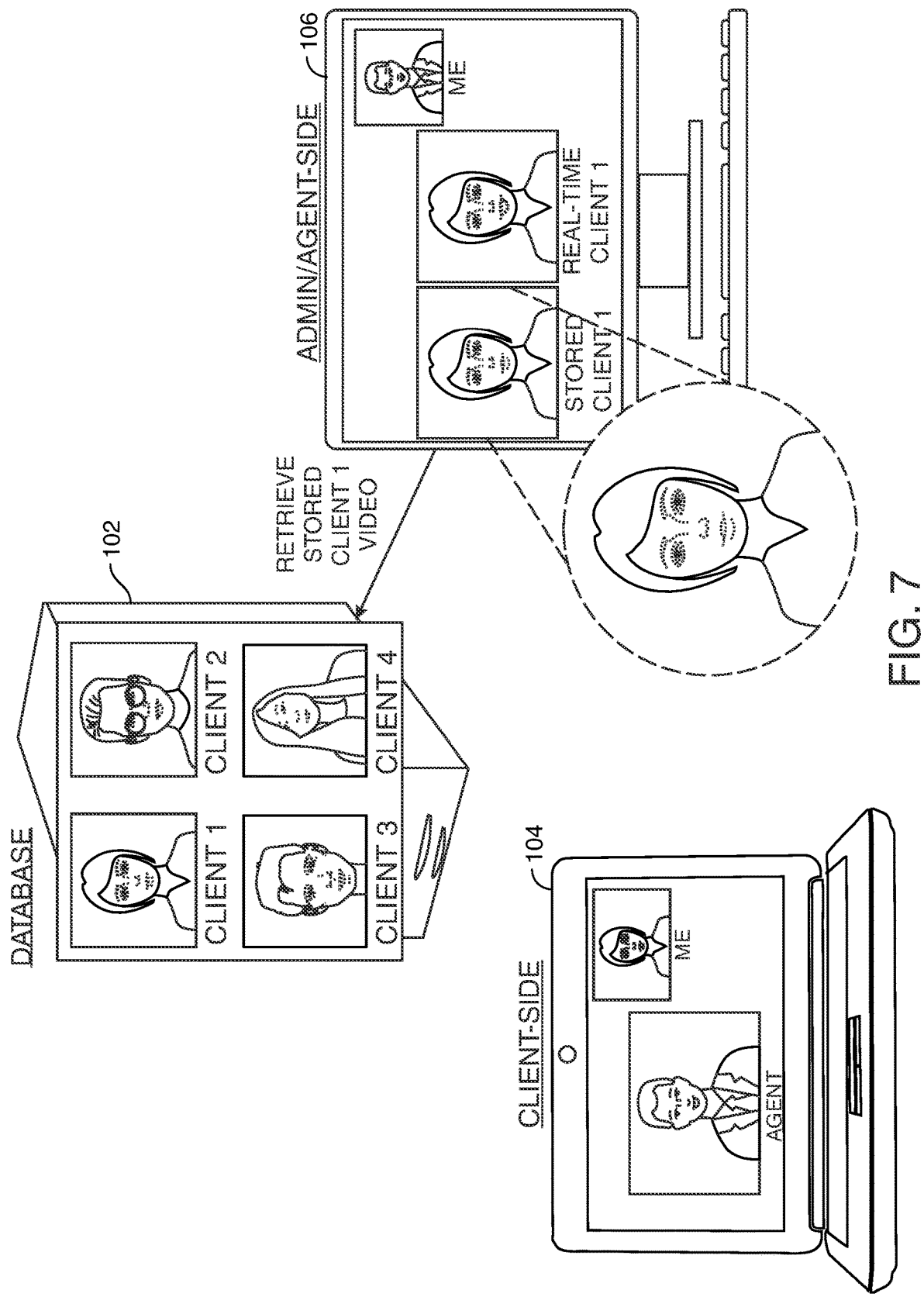
FIG. 7 shows yet another illustrative diagram in accordance with principles of the disclosure.

FIG. 7 shows an illustrative diagram. As shown in FIG. 7, the videos stored in the database may not include personally identifiable information. For example, the features of clients 1, 2, 3 and 4 may not be clearly visible. Therefore, the privacy of the clients may be protected. Additionally, in the event that the videos are retrieved by a person of malicious intent, the person of malicious intent may be unable to identify the people in the videos.

At admin/agent-side device 106, the administrative user may be able to view the stored client 1 video adjacent to the real-time client 1 video. It should be appreciated that the real-time client 1 video may or may not include PII. However, when the real-time client 1 video is compared to the stored client 1 video, the administrative user and one or more machine learning applications may be able to determine whether the two videos identify a single person. It should be appreciated that this identification determination may be made without being able to fully identify the person in the video.

Thus, a real-time, two-way video authentication system is provided. Persons skilled in the art will appreciate that the present invention can be practiced by other than the described embodiments, which are presented for purposes of illustration rather than of limitation. The present invention is limited only by the claims that follow.

What is claimed is:

1. A method for onboarding a client user to a real-time video chat authentication system, the method comprising:
during an onboarding session:
receiving a set of credentials associated with the client user;
receiving an opt-in from the client user for authentication via video capture;
initiating a video capture session at a video conferencing platform, said video capture session including a client-facing graphical user interface (GUI) and an administrator-facing GUI, said video capture session enabling the client user to communicate with an administrative user;
capturing a video capture of the client user at the video conferencing platform; and
storing the video capture at a database;
during a real-time verification session:
requesting the client user to authenticate using the video conferencing platform;
receiving approval from the client user at the video conferencing platform;
instantiating a video instance on the video conferencing platform, the video instance comprising a video window on the client-facing GUI and a video window on the administrator-facing GUI, the video instance enabling the administrative user and the client user to view a real-time video capture of each other via the video conferencing platform;
retrieving, in response to an instruction from the administrative user, the stored video capture of the client user from the database;
displaying, side-by-side, on the administrator-facing GUI:
a stored video window comprising the stored video capture; and the video window; and
receiving an indication of verification of the client user, by the administrative user, pursuant to a comparison of the stored video capture to the video of the client user on the video window on the administrator-facing GUI, wherein the indication of verification includes receiving a selection of a selectable button on the administrator-facing GUI, said selection being received from the administrative user, said selectable button indicating that the client user either passed or failed verification;
receiving the selection that the client user passed verification;
requesting authorization from the client user to store the real-time video capture of the client user being viewed on the administrator-facing GUI;
receiving authorization from the client user to store the real-time video capture of the client user; and
overwriting, at the database, the stored video capture with the real-time capture of the client user.

2. The method of claim 1, wherein the database comprises stored videos relating to a plurality of client users, said plurality of client users including the client user.

3. A method for onboarding a client user to a real-time video chat authentication system, the method comprising:
during an onboarding session:
receiving a set of credentials associated with the client user;
receiving an opt-in from the client user for authentication via video capture;
initiating a video capture session at a video conferencing platform, said video capture session including a client-facing graphical user interface (GUI) and an administrator-facing GUI, said video capture session enabling the client user to communicate with an administrative user;
capturing a video capture of the client user at the video conferencing platform; and
storing the video capture at a database;
during a real-time verification session:
requesting the client user to authenticate using the video conferencing platform;
receiving approval from the client user at the video conferencing platform;
instantiating a video instance on the video conferencing platform, the video instance comprising a video window on the client-facing GUI and a video window on the administrator-facing GUI, the video instance enabling the administrative user and the client user to view a real-time video capture of each other via the video conferencing platform;
retrieving, in response to an instruction from the administrative user, the stored video capture of the client user from the database;
displaying, side-by-side, on the administrator-facing GUI:
a stored video window comprising the stored video capture; and
the video window; and
receiving an indication of verification of the client user, by the administrative user, pursuant to a comparison of the stored video capture to the video of the client user on the video window on the administrator-facing GUI, wherein the indication of verification includes receiving a selection of a selectable button on the administrator-facing GUI, said selection being received from the administrative user, said selectable button indicating that the client user either passed or failed verification;
receiving the selection that the client user passed verification;
requesting authorization from the client user to store the real-time video capture of the client user being viewed on the administrator-facing GUI;
receiving authorization from the client user to store the real-time video capture of the client user; and
replacing, at the database, the stored video capture with the real-time capture of the client user.

4. The method of claim 1, wherein the stored video capture includes a limited amount of data.

5. The method of claim 4, wherein the limited amount of data when compared to the real-time video capture can be used to determine when the real-time video capture matches the limited amount of data over a predetermined percentage threshold.

6. The method of claim 1, wherein the stored video capture stored in the database includes a first limited amount of data, and the real-time video capture includes a second limited amount of data, and the first limited amount of data when compared to the second limited amount of data is used to verify the client user.

7. The method of claim 6, wherein the first limited amount of data and the second limited amount of data do not include personally identifiable information.

8. A real-time video chat authentication system, the system comprising:
a video conferencing application comprising:
a client-facing graphical user interface (GUI), said client-facing GUI being operated by a client user;
an administrator-facing GUI, said administrator-facing GUI being operated by an administrative user; and
a database comprising stored videos relating to a plurality of client users, said plurality of client users comprising the client user;
wherein when the administrator-facing GUI receives an instruction from the administrative user to authenticate the client user:
the client-facing GUI requests a selection from the client user to approve authentication using the video conferencing application;
upon receipt of approval from the client user, the video conferencing application instantiates a video conference instance, said video conference instance comprising a video window on the client-facing GUI and a video window on the administrator-facing GUI, said video conference instance enabling the administrative user and the client user to view each other, in real-time, via the video conferencing application;
the video conference instance retrieves a stored video of the client user from the database;
the administrator-facing GUI instantiates a stored video window, said stored video window displaying the stored video, said stored video window being adjacent to the video window on the administrator-facing GUI;
the administrator-facing GUI enables the administrative user to verify the client user by comparing the stored video to a view of the client user in the video window on the administrator-facing GUI;
the administrator-facing GUI displays a selectable button, selection of the selectable button by the administrative user indicates that the client user is verified; and the administrator-facing GUI receives a selection of the selectable button from the administrative user, said selection indicating that the client user is verified wherein upon receipt of the selection at the administrator-facing GUI that the client user passed verification:

the video window on the client-facing GUI provides a selectable authorization request to the client user to store a real-time capture from the video conferencing application;

the video window on the client-facing GUI receives authorization from the client user to store the real-time video capture from the video conferencing application; and the video conferencing application replaces the stored video capture of the client user stored in the database with the real-time video capture.

9. A real-time video chat authentication system, the system comprising:

a video conferencing application comprising:

a client-facing graphical user interface (GUI), said client-facing GUI being operated by a client user;

an administrator-facing GUI, said administrator-facing GUI being operated by an administrative user; and a database comprising stored videos relating to a plurality of client users, said plurality of client users comprising the client user;

wherein when the administrator-facing GUI receives an instruction from the administrative user to authenticate the client user:

the client-facing GUI requests a selection from the client user to approve authentication using the video conferencing application;

upon receipt of approval from the client user, the video conferencing application instantiates a video conference instance, said video conference instance comprising a video window on the client-facing GUI and a video window on the administrator-facing GUI, said video conference instance enabling the administrative user and the client user to view each other, in real-time, via the video conferencing application;

the video conference instance retrieves a stored video of the client user from the database;

the administrator-facing GUI instantiates a stored video window, said stored video window displaying the stored video, said stored video window being adjacent to the video window on the administrator-facing GUI;

the administrator-facing GUI enables the administrative user to verify the client user by comparing the stored video to a view of the client user in the video window on the administrator-facing GUI;

the administrator-facing GUI displays a selectable button, selection of the selectable button by the administrative user indicates that the client user is verified; and the administrator-facing GUI receives a selection of the selectable button from the administrative user, said selection indicating that the client user is verified; wherein upon receipt of the selection indicating that the client user is verified:

the client-facing GUI provides a selectable authorization request to the client user to store a real-time capture from the video conferencing application;

the client-facing GUI receives authorization from the client user to store the real-time video capture from the video conferencing application; and the video conferencing application overwrites the stored video capture of the client user stored in the database with the real-time video capture.

10. The real-time video chat authentication system of claim 8, wherein the stored video capture stored in the database includes a limited amount of data.

11. The real-time video chat authentication system of claim 10, wherein the limited amount of data when compared to a view of the client user, displayed on the video window on the administrator-facing GUI, is used to determine if the view of the client user matches the limited amount of data over a predetermined threshold.

12. The real-time video chat authentication system of claim 8, wherein the stored video capture stored in the database includes a first limited amount of data, and a view of the client user, displayed on the video window on the administrator-facing GUI, includes a second limited amount of data, and the first limited amount of data when compared to the second limited amount of data is used to verify the client user.

13. The real-time video chat authentication system of claim 12, wherein the first limited amount of data and the second limited amount of data do not include personally identifiable information.

* * * * *